(12) United States Patent
Kubota et al.

(10) Patent No.: US 6,256,154 B1
(45) Date of Patent: Jul. 3, 2001

(54) CATADIOPTRIC LENS, OPTICAL HEAD AND OPTICAL RECORDING AND/OR REPRODUCING APPARATUS

(75) Inventors: Shigeo Kubota, Kanagawa; Kenjiro Watanabe, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/509,417
(22) PCT Filed: Jul. 29, 1999
(86) PCT No.: PCT/JP99/04089
§ 371 Date: May 15, 2000
§ 102(e) Date: May 15, 2000
(87) PCT Pub. No.: WO00/08642
PCT Pub. Date: Feb. 17, 2000

(30) Foreign Application Priority Data

Aug. 7, 1998 (JP) .................................................. 10-224887

(51) Int. Cl.[7] .................................................. G02B 17/00
(52) U.S. Cl. ............................................. 359/728; 369/112
(58) Field of Search ..................................... 359/726, 727, 359/728, 730

(56) References Cited

U.S. PATENT DOCUMENTS

| | | | |
|---|---|---|---|
| 4,714,307 | 12/1987 | Palmer | 359/728 |
| 4,866,694 | * 9/1989 | Korth | 369/112 |
| 5,031,976 | 7/1991 | Shafer | 359/727 |
| 5,986,995 | * 11/1999 | He et al. | 369/112 |

FOREIGN PATENT DOCUMENTS

| | | |
|---|---|---|
| 0 747 744A1 | 12/1996 | (EP) . |
| 0951013A2 | 10/1999 | (EP) . |
| 2315562 | 2/1998 | (GB) . |
| 64-25113 | 1/1989 | (JP) . |
| 8-201698 | 8/1996 | (JP) . |
| WO 99/27532 | 3/1999 | (WO) . |

OTHER PUBLICATIONS

Database WPI, Derwent Publications Ltd., London, GB: AN 1998–238490, XP002154938 & RU 2091835C, Sep. 27, 1997 –Abstract.

* cited by examiner

Primary Examiner—Scott J. Sugarman
(74) Attorney, Agent, or Firm—Oblon, Spivak, McClelland, Maier & Neustadt, P.C.

(57) ABSTRACT

A lens which has corrected the coma aberration substantially completely is provided as a catadioptric lens used with advantage in utilizing the evanescent light.

The catadioptric lens is a concave non-spherical mirror having a concave refractive surface as a first surface S1, a plane mirror as a second surface S2 and a concave non-spherical mirror arranged coaxially with the concave refractive surface of the first surface S1. The parallel incident light is converged through an aperture in the plane mirror of the second surface S2 on a total reflection plane of the fourth surface S4. The radius of curvature of the first surface S1 and the optical length d from the first surface S1 to the apex of the third surface S3 are set to satisfy the sine condition.

8 Claims, 9 Drawing Sheets

CATADIOPTRIC LENS, OPTICAL HEAD AND OPTICAL RECORDING AND/OR REPRODUCING APPARATUS

TECHNICAL FIELD

This invention relates to a catadioptric lens usable with advantage for exploiting evanescent light. This invention also relates to an optical head and an optical recording and/or reproducing apparatus employing the catadioptric lens.

BACKGROUND ART

As a technique for realising high recording density of an optical recording medium, such a technique has been devised which exploits evanescent light to enable recording and/or reproduction at an extremely small recording pit not larger than the diffraction threshold. In recording and/or reproducing an optical disc using the evanescent light, the incident light beam to a lens is converged on an end face of the lens such that its major portion undergoes total reflection on the lens end face. If the distance between the lens end face and the optical recording medium is made sufficiently narrow, a portion of the evanescent light is coupled with the optical recording medium so as to be taken out to outside the lens to enable recording and/or reproduction exploiting the evanescent light.

The distance for which the evanescent light can be coupled in this manner in air is on the order of 100 nm if the numerical aperture NA of the lens is 1.5. Therefore, if recording and/or reproduction of an optical recording medium is to be performed using the evanescent light, the distance between the lens end face and the optical recording medium needs to be maintained at a level not larger than approximately 100 nm. This can be realized using the flying head technique used e.g., in a magnetic disc.

That is, if, with the use of the flying head technique used in a magnetic disc, the distance between the lens end face and the optical recording medium is maintained at approximately 100 nm or less, a portion of the evanescent light is coupled with the optical recording medium to enable recording and/or reproduction at an extremely small recording pit not larger than the limit of diffraction.

The technique of exploiting a catadioptric lens for recording and/or reproduction exploiting this evanescent light has been proposed by C. W. Lee of Samson Electronics Inc. at an optical data storage meeting in USA in May 1998.

However, analysis of lens data of the catadioptric lens proposed by C. W. Lee reveals that correction of the coma aberration is not optimum, such that use of this catadioptric lens raises the following problem:

That is, if the evanescent light is to be used, the incident light beam needs to be converged with a small spot diameter on the lens end face. However, since the coma aberration can be corrected only incompletely with the catadioptric lens, such that, if the angle of incidence of the light beam exceeds ±1°, due to an error in the mounting angle of the catadioptric lens, the coma aberration is produced outstandingly, such that it becomes impossible to converge the incident light beam on the lens end face with a small spot diameter.

Moreover, in a near-field optical system, exploiting the evanescent light, it may be estimated that the effect of the coma aberration presents itself more significantly than if a light beam is converged in a far-field optical system with a small spot diameter. Therefore, if assumed that the catadioptric lens is used in the near-field optical system, it may be premeditated that, when mounting the catadioptric lens, the error in the mounting angle thereof needs to be appreciably smaller than ±1°.

That is, since the correction of the coma aberration is incomplete in the catadioptric lens, extremely high precision is required in mounting the catadioptric lens. In particular, it is extremely difficult to realize the mounting at a precision which permits use of the catadioptric lens in the near-field optical system. If this could be achieved, the manufacturing cost is necessarily prohibitive.

Disclosure of the Invention

An object of the present invention, proposed with the above-described status of the art in mind, is to provide a catadioptric lens in which the coma aberration has been corrected nearly completely for use in exploiting the evanescent light. Another object is to provide an optical head and an optical recording and/or reproducing apparatus exploiting this catadioptric lens.

A catadioptric lens according to the present invention is such a lens in which a first surface is a concave refractive surface, a second surface is a plane mirror, and a third surface is a concave non-spherical mirror, arranged co-axially with the concave refractive surface of the first surface, and in which a parallel incident light beam is converged through an aperture provided in the plane mirror of the second surface on a plane of total reflection of the fourth surface.

Let $r_1$ and $r_3$ be the radius of curvature of the first surface and the center radius of curvature of the third surface, and let d be an optical length from the first surface to an apex of the third surface. Also, let $f_a(N)$ and $f_b(N)$ be coefficients represented as functions of the refractive index N of a lens medium, and also let a condition satisfying the sine condition be as shown in the following equation:

$$d/r_3 = f_a(N) r_1/r_3 \times f_b(N) \quad (1).$$

Moreover, let the value of the radius of curvature $r_1$ of the first surface and the value of the optical length d from the first surface to the apex of the third surface, when the above equation (1) is satisfied, be R and D, respectively.

Then, the radius of curvature $r_1$ of the first surface is R±1% and the optical length d from the first surface to the apex of the third surface is D±0.5%.

In the catadioptric lens of the present invention, a lens may be arranged upstream of the first surface. By providing the lens upstream of the first surface, the diffused light may be turned into collimated light which then is allowed to fall on the first surface. The lens arranged upstream of the catadioptric lens is preferably a meniscus convex lens.

The catadioptric lens according to the present invention may be configured so that each of the first to third surfaces is constituted by a first lens medium and the fourth surface is constituted by a second lens medium and so that the second lens medium is bonded to the plane containing the second surface constituted by the lens medium. A magnetic field generating coil may be buried in the second lens medium.

The catadioptric lens according to the present invention may be configured so that third surface is a routine non-spherical surface represented by the equation $$X = (Y^2/R)/[1 + \{1 - (1 + K)(Y/R)^2\}^{1/2}] + AY^4 + BY^6 + CY^8 + DY^{10} \qquad (2)$$

where, as to the third surface, X is the depth from the apex of the surface, Y is the height from the optical axis, R is the center radius of curvature, K is the conical coefficient, A is the non-spherical coefficient of the term $Y^4$, B is the non-spherical coefficient of the term $Y^6$, C is the non-spherical coefficient of the term $Y^4$, and D is the non-spherical coefficient of the term $Y^{10}$.

In the catadioptric lens of the present invention, the refractive index of the lens medium is preferably not less than 1.4 in the working wavelength range. By employing a lens medium having a larger refractive index, it is possible to reduce the diameter of the light spot formed on the fourth surface.

With the catadioptric lens according to the present invention, the coma aberration, which is the asymmetric aberration, is corrected nearly completely, such that the off-axis aberration is only the astigmatic aberration which is the symmetric aberration. Thus, with the catadioptric lens of the present invention, an ideal light spot can be formed on the end face of the lens within an operating range within which the effect of the astigmatic aberration is tolerated, that is, within the range of ±3° of the light beam incident angle.

An optical head according to the present invention is such an optical head provided with the above-described catadioptric lens of the present invention as an objective lens. With this optical head employing the inventive catadioptric lens, in which the coma aberration may be eliminated nearly completely, the tolerance of the mounting errors can be wider than with the conventional practice.

An optical recording and/or reproducing apparatus according to the present invention records and/or reproduces an optical recording medium using an optical head provided with the above-described catadioptric lens as an objective lens. With this optical head employing the inventive catadioptric lens, in which the coma aberration may be eliminated nearly completely, the tolerance of the mounting errors can be wider than with the conventional practice.

BEST MODE FOR CARRYING OUT THE INVENTION

Referring to the drawings, certain preferred embodiments of the present invention will be explained in detail.

Figure 1:
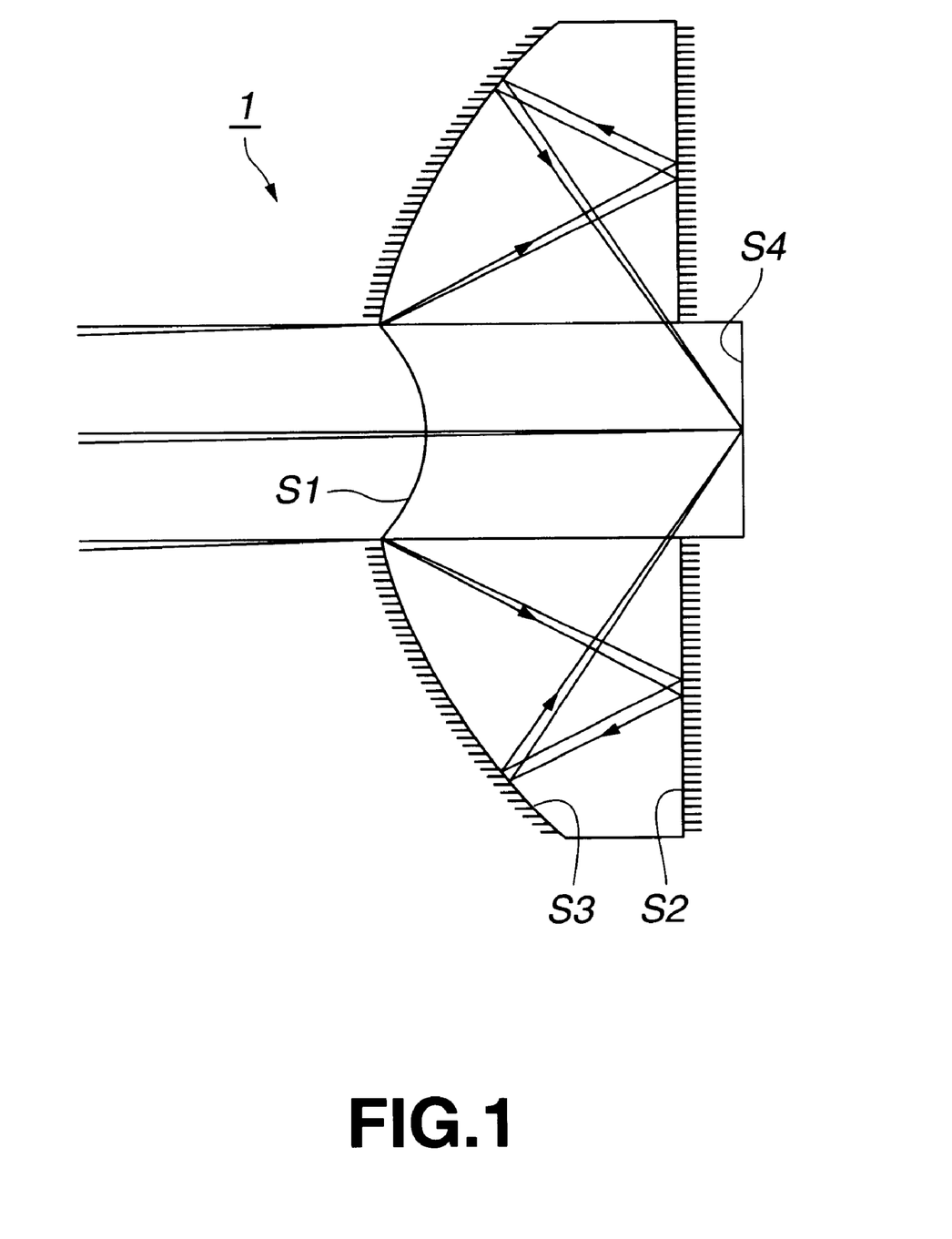
FIG. 1 shows an embodiment of a catadioptric lens embodying the present invention.

FIG. 1 shows an embodiment of a catadioptric lens 1 according to the present invention. This catadioptric lens 1 is made up of a first surface S1, comprised of a concave refractive surface, a second surface S2, comprised of a plane mirror, a third surface S3, comprised of a concave non-spherical mirror, and a fourth surface S4 comprised of a plane of total reflection.

The incident light beam on the catadioptric lens 1 is first magnified by the first surface S1, comprised of the concave refractive surface, and reflected by the second surface S2, so as to fall on the third surface S3, comprised of the concave non-spherical mirror. The light beam then is reflected by the third surface S3 so as to be converged on a fourth surface S4 of total reflection through an aperture formed centrally of the second surface S2.

Table 1 below shows lens data of the catadioptric lens 1 embodying the present invention.

TABLE 1

|  | radius of curvature [mm] | conical and non-spherical coefficients | distance on axis [mm] | refractive index (wavelength λ = 650 nm) |
|---|---|---|---|---|
| object surface | ∞ | — | ∞ | air |
| first surface S1 | −0.67 | — | 1.2 | 1.813 |
| second surface S2 | ∞ | — | −1.5 | reflection |
| third surface S3 | −2.5308 | K: −1.567612<br>A: 0.113258 × 10⁻¹<br>B: 0.328582 × 10⁻³<br>C: 0.292915 × 10⁻⁴<br>D: 0.113498 × 10⁻⁴ | 1.812138 | reflection |
| fourth surface S4 | ∞ | — | — | — | aperture NA = 1.5, focal length f = 0.6456 mm $$\text{non-spherical formula } X = \frac{Y^2/R}{1 + \{1 - (1+K)(Y/R)^2\}^{1/2}} + AY^4 + BY^6 + CY^8 + DY^{10}$$

Figure 2A:
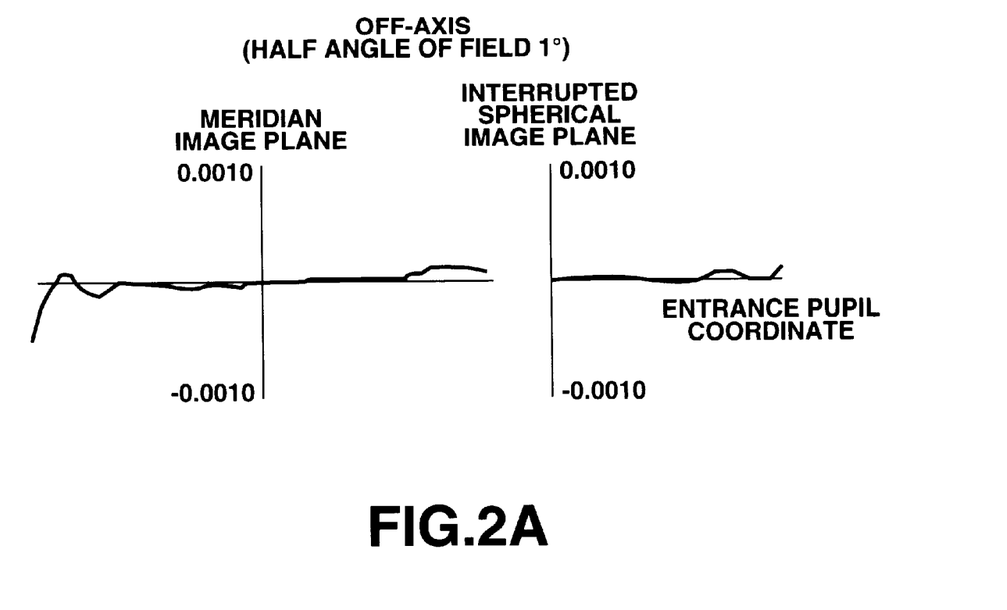
FIGS. 2A and 2B are lateral aberration diagrams of the catadioptric lens shown in FIG. 1, with FIG. 2A showing lateral aberration outside the axis of a half picture angle of 1° and FIG. 2B showing the lateral aberration on the axis.
Figure 2B:
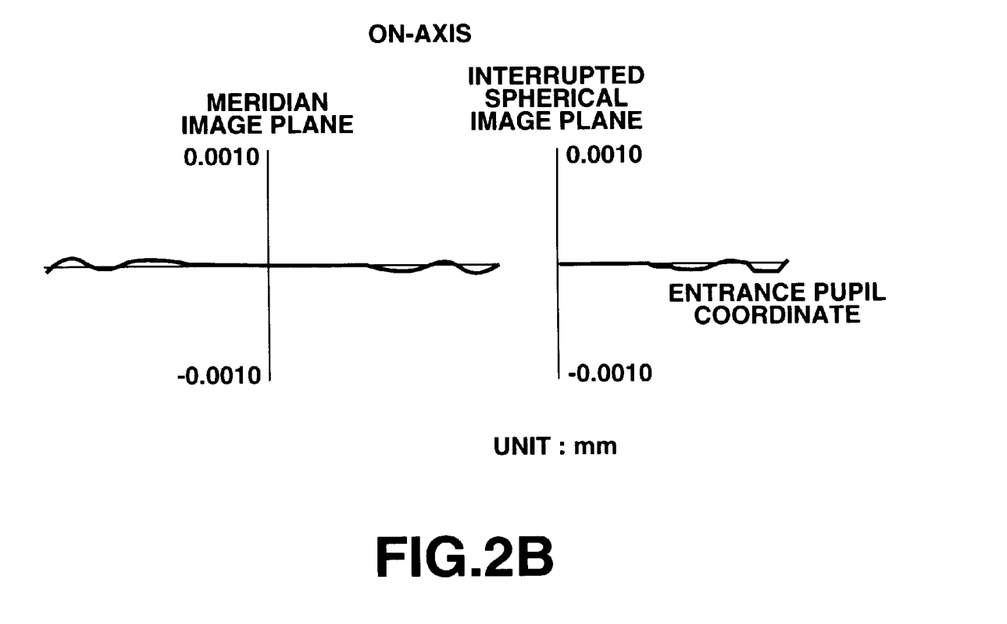

X: depth from the apex of a surface Y: height from the optical axis
R: radius of curvature on the optical axis K: conical coefficient
A: non-spherical coefficient of a term $Y^4$ B: non-spherical coefficient of a term $Y^6$
C: non-spherical coefficient of a term $Y^8$ D: non-spherical coefficient of a term $Y^{10}$ FIG. 2 shows the performance of the lateral aberration of the catadioptric lens 1. FIG. 2A shows the lateral aberration outside the axis with the half angle of field of 1° and FIG. 2B shows the lateral aberration on the axis. The light source wavelength λ is set to 650 nm.

Referring to FIG. 2, the lateral aberration of the catadioptric lens 1 is appreciably smaller than 1 μm corresponding to the full scale, across the entire light beam traversing the entrance pupil. Thus, the amount of the produced lateral aberration is extremely small. This amount of the produced lateral aberration, expressed as an RMS value of the wavefront aberration, that is the standard deviation (root mean square) of the wavefront aberration on the plane of the exit pupil, was 0.002 λ and 0.006 λ on the axis and outside the axis, with the half angle of field of 1°, respectively. Although not shown, the RMS value of the wavefront aberration outside the axis with the half angle of field of 3° was 0.04λ.

In expressing the aberration performance in the diffraction limit, the Mareshal's criterion is routinely used. The Mareshal's criterion in terms of an RMS value of the wavefront aberration is 0.07λ. In the above-described catadioptric lens 1, the RMS values of the wavefront aberration on the axis, outside the axis, with the half angle of field of 1°, and outside the axis, with the half angle of field of 3°, were equal to 0.002λ, 0.006λ, and 0.04λ, respectively. Thus, the catadioptric lens 1 may be said to have sufficient diffraction limit performance at least from the on-axis position to the off-axis position with the half angle of field of 3°.

Figure 3:
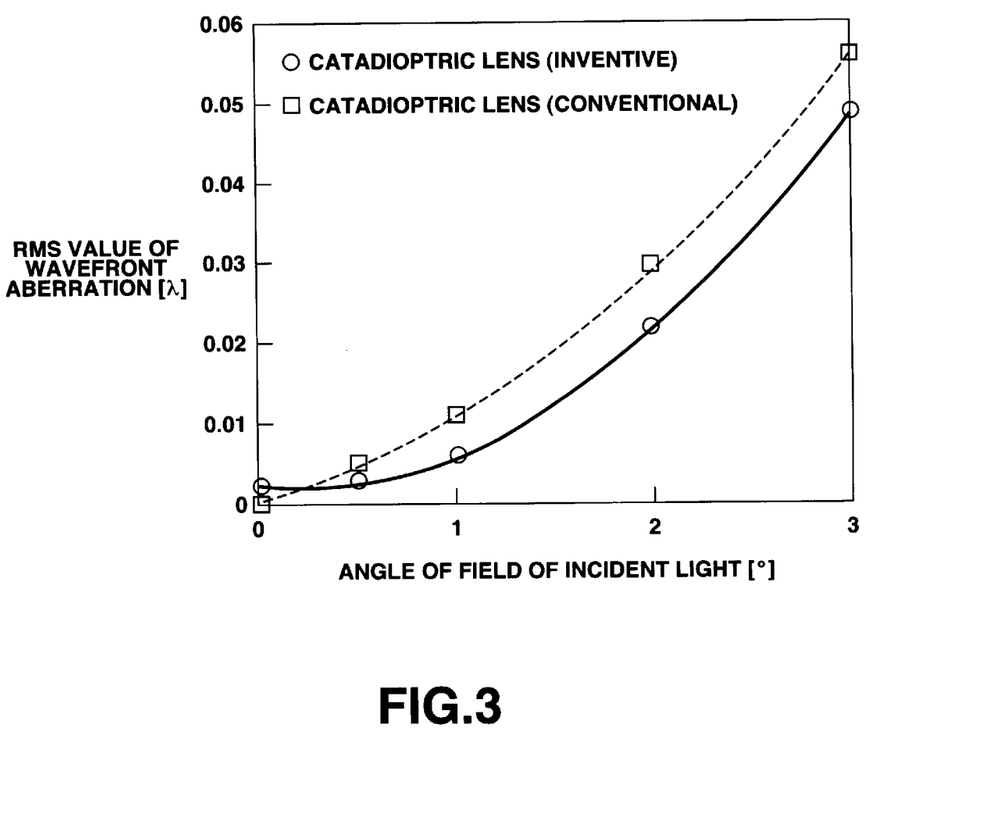
FIG. 3 shows the relation between the angle of field of the incident light and an RMS value of the wavefront aberration for a catadioptric lens shown in FIG. 1 and a conventional catadioptric lens.

The off-axis performance of the catadioptric lens 1 is shown in FIG. 3, in which the abscissa denotes the angle of field of the incident light (value of the half angle of field) and the ordinate denotes RMS values of the wavefront aberration. FIG. 3 also shows the off-axis performance of the aforementioned catadioptric lens proposed by C. W. Lee, referred to below as the conventional catadioptric lens. In FIG. 3, ○ denotes the performance of the catadioptric lens 1 and □ denotes that of the conventional catadioptric lens.

With the conventional catadioptric lens, the RMS value of the wavefront aberration increases approximately linearly with respect to the angle of field, for the half angle of field not larger than 1°, as shown in FIG. 3. This means that, among different off-axis aberrations, the coma aberration is predominant.

On the other hand, with the inventive catadioptric lens 1, the RMS value of the wavefront aberration increases quadratically with respect to the angle of field in a range shown in FIG. 3. This means that, among different off-axis aberrations, the astigmatic aberration is predominant.

In a lens for an optical head, used for recording and/or reproducing an optical recording medium, it is usually desirable that the spherical aberration and the coma aberration be corrected sufficiently. In the inventive catadioptric lens 1, the spherical aberration is rather apparent, however, it may be said to be negligible, while the coma aberration has been corrected satisfactorily. Thus, the present catadioptric lens 1 is optimum as a lens for an optical head. Moreover, with the catadioptric lens 1 according to the present invention, the RMS value of the wavefront aberration is always smaller than that of the conventional catadioptric lens, at least in a range up to the half angle of field of 3°, except the value at the on-axis area where the spherical aberration is prevalent.

Meanwhile, the Mareshal's criterion is the condition for image formation (convergence) in the far-axis optical system with a small spot diameter, such that, in a near-field optical system where the evanescent light is utilized, the effect of the coma aberration will be displayed more outstandingly than may be expected from the Mareshal's criterion. Therefore, the catadioptric lens 1 of the present invention, in which only negligible coma aberration is produced, may be said to be particularly useful as far as the application to the near-field optical system exploiting the evanescent light is concerned.

The manner of how the coma aberration has been corrected is hereinafter explained.

Among a variety of methods for evaluating the coma aberration, the method of calculating order-three Seidel coma aberration coefficients can be executed relatively easily. This method is stated in Yoshiya Matsui, "Lens Designing Method", published by KYORITSU SHUPPAN KK, 1970. However, in the high NA lens, such as the inventive catadioptric lens, the technique of utilizing order-three coma aberration coefficients as an evaluation value is not necessarily optimum, because higher order coma aberration is produced simultaneously.

Therefore, in the present invention, the coma aberration was corrected by evaluating the sine condition. That is, since higher order coma aberration can be evaluated using the sine condition, the technique of correcting the coma aberration by evaluating the sine condition was here used. Meanwhile, the method of calculating the sine condition of the lens system including the non-spherical surface is shown in, for example, R. Kingslake, "Lens Design Fundamentals", Academic Press, 1978.

Figure 4:
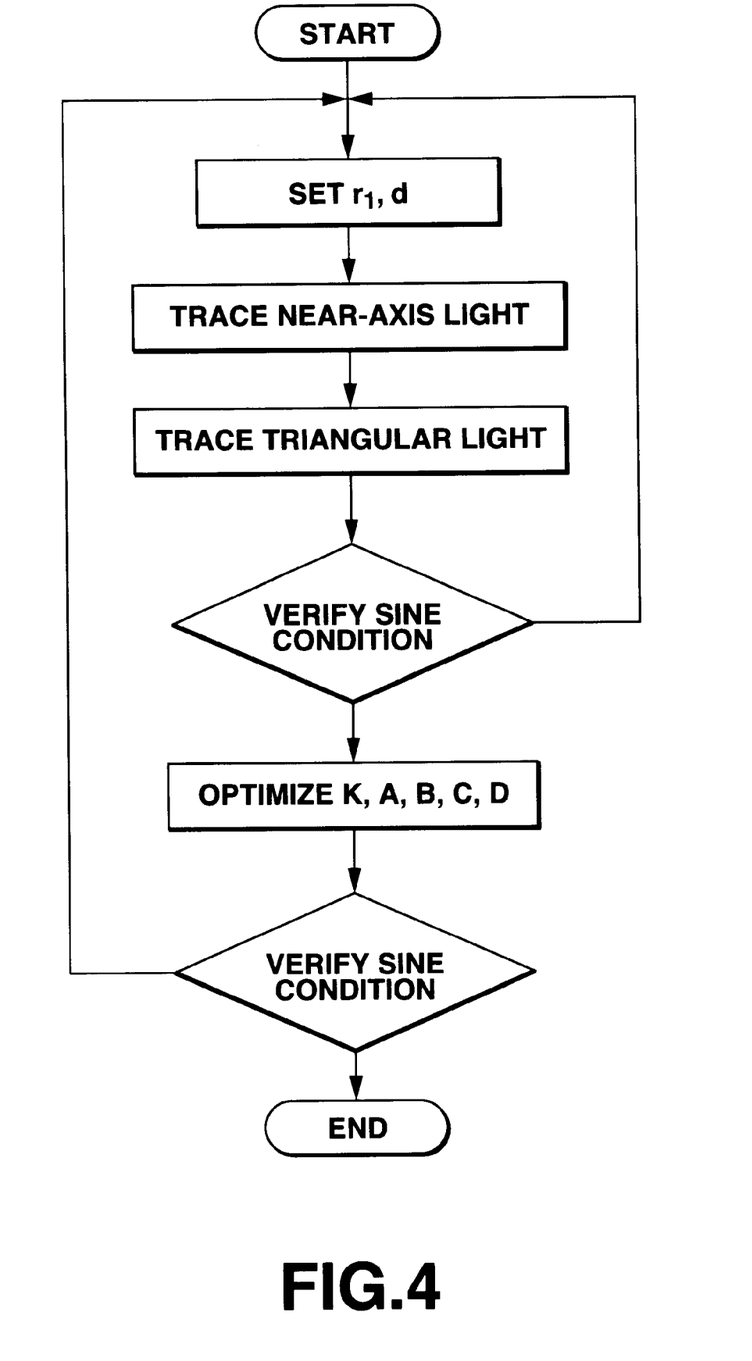
FIG. 4 shows the processing flow when correcting the coma aberration by evaluating the sine condition to optimize the catadioptric lens.

In evaluating the sine condition to correct the coma aberration, the radius of curvature $r_1$ of the first surface and the optical length d from the first surface to an apex of the third surface are first set, as shown in FIG. 4. The diameter of the light beam is adjusted at this time so that the numerical aperture NA will be of a predetermined value. The sine condition is calculated, using a near-axis light follow-up value and a triangular light follow-up value to check the sine condition. The radius of curvature $r_1$ of the first surface and the optical length d from the first surface to the apex of the third surface are re-set, until the sine condition non-satisfying value will be approximately 0, to execute the sine condition calculations repeatedly.

If, as a result of the repeated calculations, the sine condition non-satisfying value is approximately 0, the conical coefficient K and the non-spherical coefficients A, B, C, D are optimized, using the general-purpose lens designing program, so that the residual spherical aberration will be minimum. The sine condition is re-calculated to check the sine condition. If the sine condition non-satisfying value is large, the radius of curvature $r_1$ of the first surface and the optical length d from the first surface to an apex of the third surface are re-set to repeat the calculations.

By carrying out the above calculations, the coma aberration, inclusive of the higher order coma aberrations, can be calculated.

Table 2 shows a portion of the results of calculations. Here, the longitudinal spherical aberration LA and the sine condition non-satisfying value OSC were calculated, as the optical length d from the first surface to the apex point of the third surface was maintained constant and as the radius of curvature $r_1$ of the first surface was changed. The numerical aperture NA was set to a constant value by adjusting the incident light beam. In the calculations, the entrance pupil was set on the non-spherical reflecting surface as a third surface.

TABLE 2

| $r_1$ | d | LA | OSC | NA |
|---|---|---|---|---|
| 0.65 | −2.7 | −0.0646826 | −0.0081699 | 1.4999 |
| 0.67 | −2.7 | −0.0662784 | 0.0001478 | 1.5000 |
| 0.70 | −2.7 | −0.0685404 | 0.0112814 | 1.5000 |
| 0.72 | −2.7 | −0.0699606 | 0.0179294 | 1.4999 |

In Table 2, $r_1$ is the radius of curvature of the first surface, d is the optical length from the first surface to the apex of the third surface, NA is the numerical aperture, LA is the longitudinal spherical aberration and OSC is the sine condition non-satisfying value. The code used was of an opposite sign to that of the routinely used code in accordance with prescriptions by the Kingslay's definition. In Table 2, $r_1$=0.70 stands for the conventional catadioptric lens.

In the conventional catadioptric lens, with $r_1$=0.70, the sine condition non-satisfying value OSC is approximately 0.0113, as shown in Table 2. According to Conrady, the sine condition non-satisfying value in a telescope or a microscope is to be ±0.0025. The sine condition non-satisfying value OCS of the conventional catadioptric lens departs from the Conrady's criterion. On the other hand, if the radius of curvature $r_1$ of the first surface is diminished by approximately 5% to $r_1$=0.67, the sine condition non-satisfying value is approximately 0. Meanwhile, the absolute value of the spherical aberration is slightly increased at the same time as this time.

Figure 5:
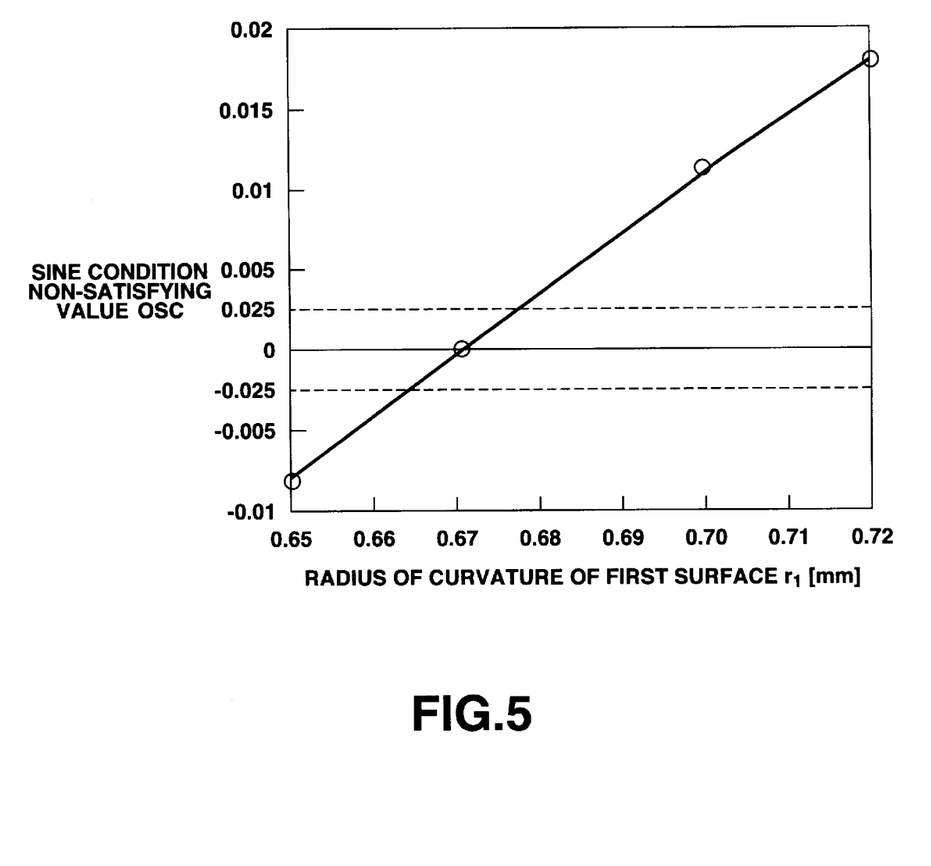
FIG. 5 shows the relationship between a radius of curvature $r_1$ of the first surface and the sine condition non-satisfying value OSC when the optical length d from the first surface to an apex of the third surface of the catadioptric lens is kept constant.

FIG. 5 shows a graph in which are plotted the calculated results shown in Table 2. In FIG. 5, the abscissa denotes the radius of curvature $r_1$ of the first surface and the ordinate denotes the sine condition non-satisfying value OCS. In FIG. 5, broken lines denote the range of the Conrady's criterion (±0.0025).

In FIG. 5, the range of the radius of curvature $r_1$ of the first surface satisfying the Conrady's criterion is approximately 0.66335 to 0.67591, having 0.67 approximately at the center of the range. Therefore, the range of the radius of curvature $r_1$ satisfying tie Conrady's criterion is approximately 0.67±1%.

Figure 6:
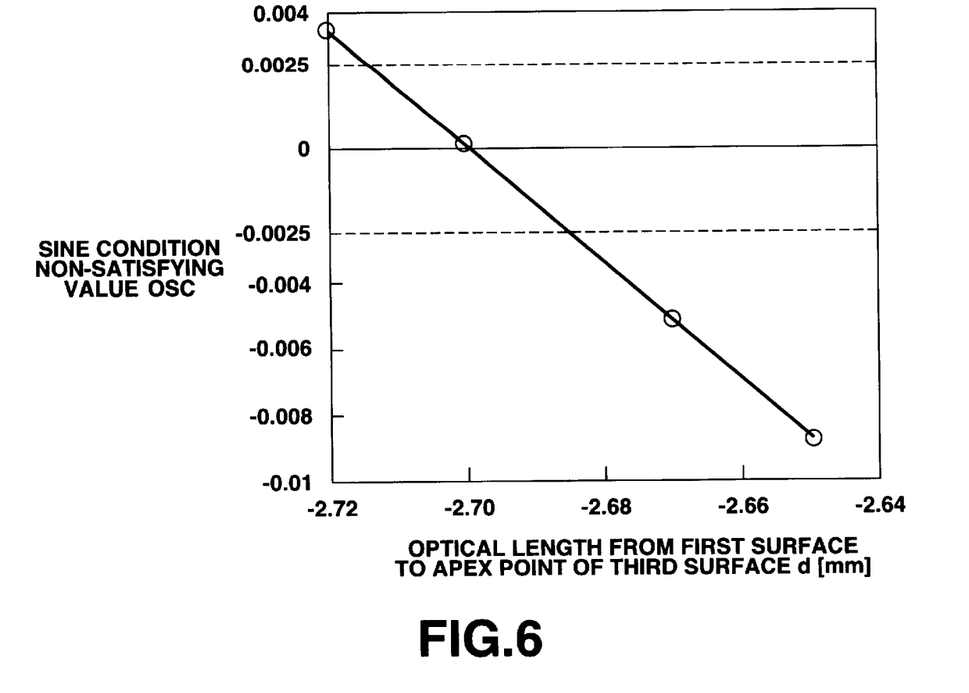
FIG. 6 shows the relationship between a radius of curvature $r_1$ of the first surface and the sine condition non-satisfying value OSC when the radius of curvature $r_1$ of the first surface of the catadioptric lens is kept constant.

Meanwhile, if the radius of curvature $r_1$ of the first surface is maintained constant and the optical length d from the first surface to the apex of the third surface is changed, the sine condition non-satisfying value OCS is changed. Thus, the sine condition non-satisfying value OCS was calculated as the optical length d from the first surface to the apex of the third surface was changed, with the radius of curvature $r_1$ of the first surface remaining constant. FIG. 6 shows the graph in which the calculated results are plotted as in FIG. 5. In FIG. 6, the abscissa denotes the optical length d from the first surface to the apex of the third surface and the ordinate denotes the sine condition non-satisfying value OCS. Also, in FIG. 6, the broken lines denote the range of the Conrady's criterion (±0.0025).

Referring to FIG. 6, the range of the optical length d from the first surface to the apex of the third surface, satisfying the Conrady's criterion, is approximately from −2.7122 to −2.68312, having −2.7 approximately as a median point. Thus, the range of the optical length d from the first surface to the apex of the third surface, satisfying the Conrady's criterion, is approximately 2.7±0.5%, if expressed as an absolute value.

From the results of FIGS. 5 and 6, a set ($r_1$, d) satisfying the condition of the sine condition non-satisfying value 0 may be presumed to exist. In actuality, the trajectory of the points ($r_1$, d) satisfying the condition is close to a straight line, the coefficient of which is a function of the refractive index N of the lens medium.

Thus, if the sine condition non-satisfying value =0 is met, the relationship between the radius of curvature $r_1$ of the first surface, normalized by the center radius of curvature $r_3$ of the third surface, and the optical length d from the first surface to the apex of the third surface, normalized with the center radius of curvature $r_3$ of the third surface, is expressed by the equation of the following linear function(1—1):

$$d/r_3 = f_a(N) r_1/r_3 + f_b(N) \qquad (1\text{—}1)$$

where the coefficients $f_a(N)$ and $f_b(N)$ are functions of the refractive index N of the lens medium.

Figure 7:
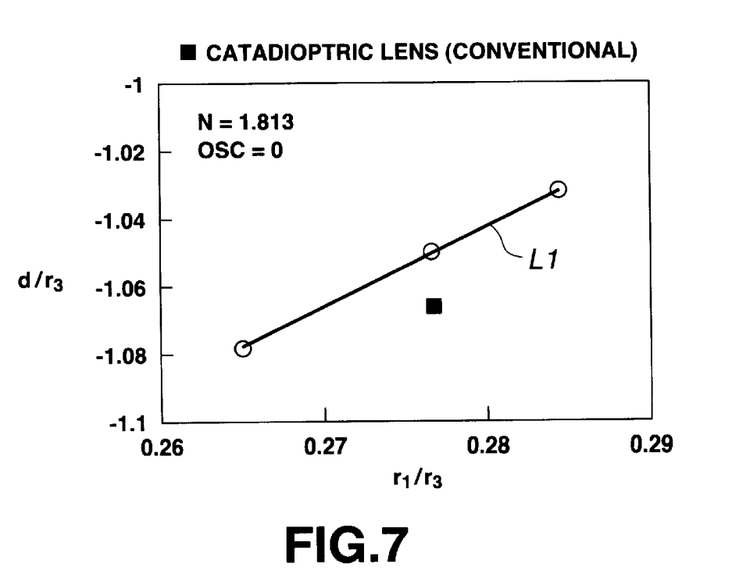
FIG. 7 shows the relationship between a value of the radius of curvature $r_1/r_3$ of the first surface normalized with the radius of curvature of the third surface and a value of the optical length $d/r_3$ from the first surface to the apex point of the third surface normalized with the radius of curvature of the third surface, satisfying the condition of the sine condition non-satisfying value =0 for the refractive index N of the lens medium of 1.813.

FIG. 7 shows the results of calculations of the relationship between $d/r_3$ and $r_1/r_3$ satisfying the sine condition non-satisfying value =0, with the refractive index N of the lens medium of 1.813, as a specific example. The trajectory of points satisfying the condition of the sine condition non-satisfying value =0, with the refractive index N of the lens medium of 1.813, is represented substantially by a straight line, as shown in FIG. 7. This straight line L1 is expressed by the linear function shown by the equation (1–2):

$$d/r_3 = 2.3234 r_1/r_3 - 1.6931 \qquad (1\text{–}2)$$

That is, if, with the refractive index N of the lens medium of 1.813, the radius of curvature $r_1$ of the first surface and the optical length d from the first surface to the apex of the third surface are set so as to satisfy the linear function shown in the equation (1–2), the sine condition non-satisfying magnitude is approximately 0, thus suppressing the occurrence of the coma aberration inclusive of the higher-order aberration.

Meanwhile, FIG. 7 plots where the conventional catadioptric lens is positioned. It is seen from FIG. 7 that the conventional catadioptric lens departs from the linear function shown in the equation (1–2). It is also seen from FIG. 7 that, if the condition of the sine condition non-satisfying magnitude =0 is met, the optical length d from the first surface to the apex of the third surface, as normalized by the center radius of curvature $r_3$ of the third surface, is approximately unity.

It is noted that, if the Conrady's criterion is to be met, as described above, it suffices if the value of the radius of curvature $r_1$ of the first surface is suppressed to be within ±1% id its optimum value, while the value of the optical length d from the first surface to the apex of the third surface is suppressed to be within ±0.5% of its optimum value. Thus, according to the present invention, if the value of the radius of curvature $r_1$ of the first surface and the value of the optical length d from the first surface to the apex of the third surface when the equation (1—1) is met are R and D, respectively, the radius of curvature $r_1$ of the first surface is prescribed to be R±1%, whilst the optical length d from the first surface to the apex of the third surface is prescribed to be D±0.5 %.

That is, by setting the radius of curvature $r_1$ of the first surface and the optical length d from the first surface to the apex of the third surface to R±1% and D±0.5%, respectively, it is possible to suppress the occurrence of the coma aberration inclusive of the higher-order aberration so as to satisfy the Conrady's criterion.

The present invention is not limited to the above-described embodiments. For example, the refractive index of the lens medium or the center radius of curvature of the third surface may depart from the values of the embodiments. If these values are different from those of the embodiments, it is possible to realize a catadioptric lens with suppressed coma aberration, inclusive of the higher-order aberration, by correcting the coma aberration using the sine condition as the evaluation value.

Figure 8:
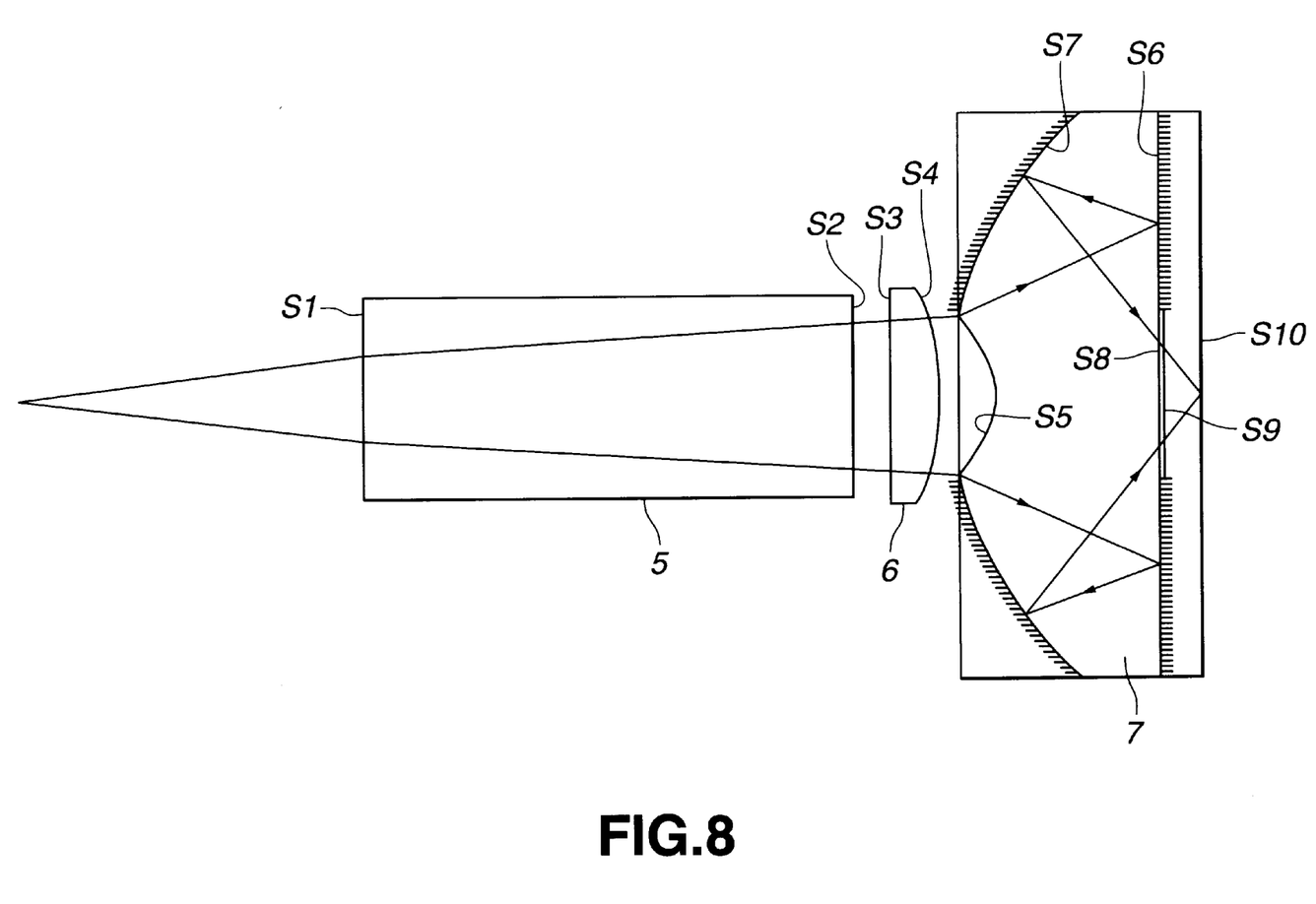
FIG. 8 shows another embodiment of a catadioptric lens according to the present invention.

FIG. 8 shows an embodiment in which a convex lens is arranged upstream of the first surface of the catadioptric lens shown in FIG. 1.

The optical system shown in FIG. 8 is used for converging the diffused light beam radiated from a light source, such as a single-mode optical fiber, and includes a prism 5, a convex lens 6 and a catadioptric lens 7, arranged in this order. Table 3 shows lens data of the present optical system. FIG. 8, on the other hand, shows the face numbers of the catadioptric lens.

TABLE 3

|  | radius of curvature [mm] | conical and non-spherical coefficients | distance on axis (mm) | refractive index (wavelength λ = 650 nm) | vitreous material |
| --- | --- | --- | --- | --- | --- |
| object surface | ∞ | — | 2.448820 | air | — |
| first surface S1 | ∞ | — | 4 | 1.51452 | BK7 |
| second surface S2 | ∞ | — | 0.2 | air | — |
| third surface S3 | 152.93265 | — | 0.2 | 1.77666 | SF11 |
| fourth surface S4 | −4.30933 | — | 0.35 | air | — |
| fifth surface S5 | −0.67 | — | 1.1842 | 1.8007 | SLAH53 |
| sixth surface S6 | ∞ | — | −1.5158 | reflect on | — |
| seventh surface S7 | −2.5308 | K: −0.119192<br>A: $0.163133 \times 10^{-3}$<br>B: $0.275907 \times 10^{-4}$<br>C: $0.147 \times 10^{-5}$<br>D: $0.127 \times 10^{-5}$ | 1.5158 | reflection | — |
| eighth surface S8 | ∞ | — | 0.0003 | 1.5612 | BACD11 (adhesive) |
| ninth surface S9 | ∞ | — | 0.29367 | 1.8007 | SLAH53 (substrate) |
| image surface | ∞ | — | — | — | — |

TABLE 3-continued

| radius of curvature [mm] | conical and non-spherical coefficients | distance on axis (mm) | refractive index (wavelength λ = 650 nm) | vitreous material |
|---|---|---|---|---| image side NA: 1.5; object side NA: 0.1 synthesized focal length: 0.7546 mm; multiplication factor: 0.0666; object-image distance: 8.677 mm; image height: 0.005 mm; on-axis color aberration: 44 nm (for wavelength shift of 5 nm; image surface curvature: 49 nm (for image height of 5 μm); sine condition non-satisfying magnitude: $3.5 \times 10^{-5}$ non-sphericity equation X =

$$\frac{Y^2/R}{1+\{1-(1+K)(Y/R)^2\}^{1/2}} + AY^4 + BY^6 + CY^8 + DY^{10}$$

Figure 9A:
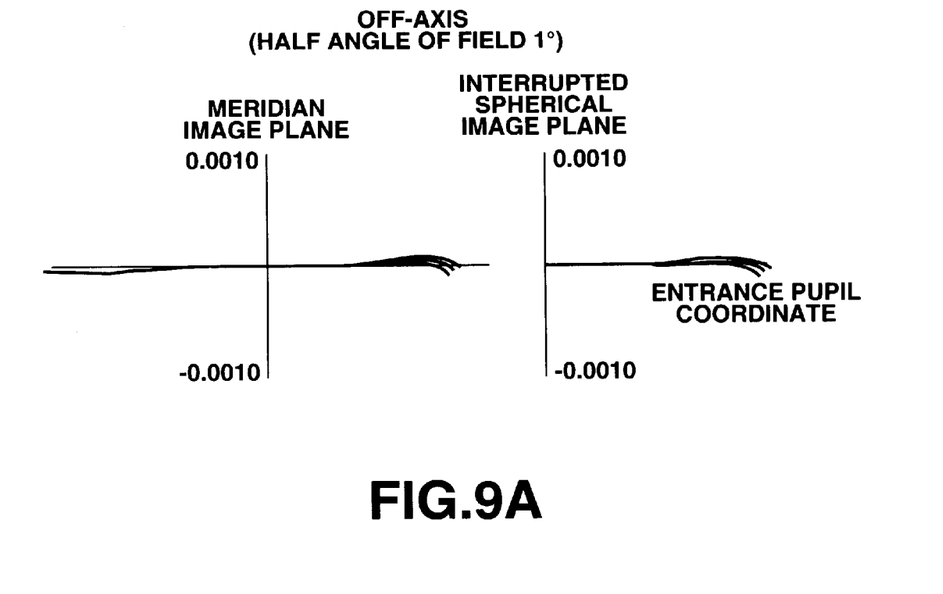
FIGS. 9A and 9B are lateral aberration diagrams of the optical system shown in FIG. 8, with FIG. 9A showing the lateral aberration outside the axis of the half angle of field of 1° and with FIG. 9B showing the lateral aberration on the axis.
Figure 9B:
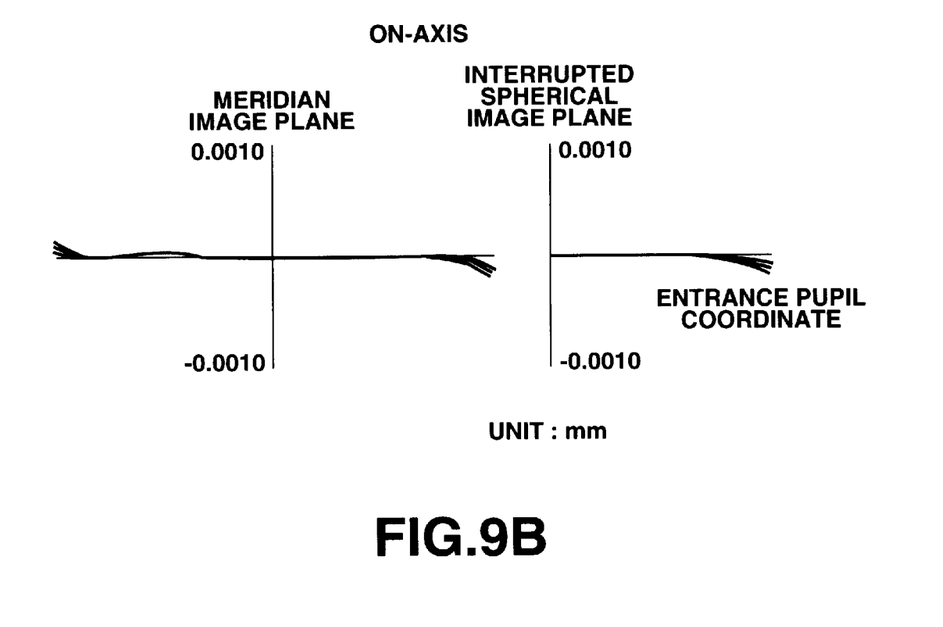

X: depth from the face apex; Y: height from the optical axis; R: radius of curvature on the optical axis; K: conical coefficient; A: non-sphericity coefficient of $Y^4$ term; B: non-sphericity coefficient of $Y^6$ term; C: non-sphericity coefficient of $Y^8$ term; D: non-sphericity coefficient of $Y^{10}$ term FIGS. 9A and 9B show the horizontal aberration performance of the optical system. Specifically, FIG. 9A the off-axis lateral aberration for the half-image angle of 1°, whilst FIG. 9B shows the on-axis lateral aberration. Here, the entrance pupil is set on the front surface of the prism 5 and vignetting of 15% of the radius of the pupil is assumed for the image height of 5 μm. The evaluation was made at three wavelengths of 647.5 nm, 650 nm and 652.5 nm.

The lateral aberration in this optical system is appreciably smaller than 1 μm of the full scale, across the entire light beam traversing the entrance pupil, such that the amount of the lateral aberration is extremely small.

In this optical system, high dispersion SF11 is used as the vitreous material of the lens 6, arranged upstream of the first surface of the catadioptric lens 7, catadioptric lens 7, while the low-dispersion SLAH 53 is used as a vitreous material of the catadioptric lens 7. The color aberration can be corrected by combining a lens of a high dispersion vitreous material and a lens of a low dispersion vitreous material.

Figure 10:
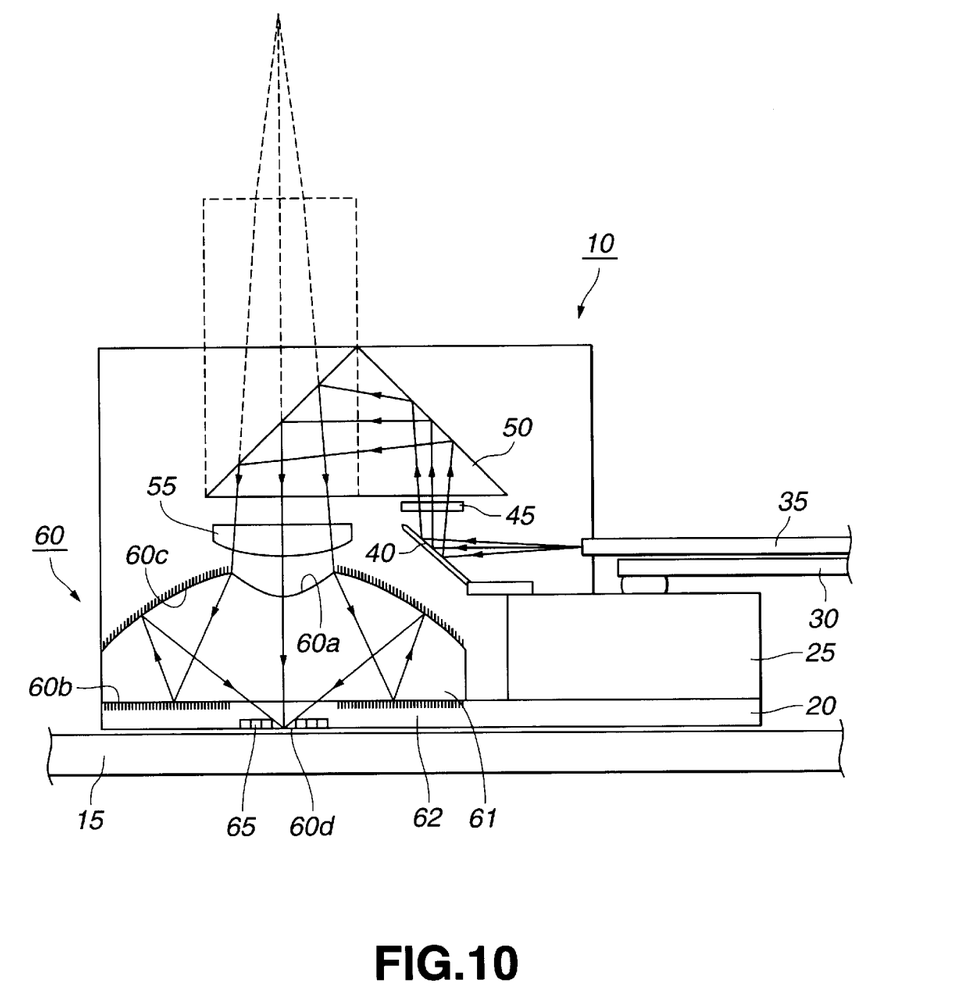
FIG. 10 shows an embodiment of an optical head according to the present invention.

FIG. 10 shows an example of an optical head embodying the present invention. This optical head 10 performs recording and/or reproduction for a magneto-optical disc 15 and is able to record and/or reproduce extremely small-sized recording pits not larger than the diffraction threshold by exploiting the evanescent light.

The magneto-optical disc 15, adapted to be recorded and/or reproduced, has a photomagnetic recording layer formed on the substrate, and is arranged with the photomagnetic recording layer facing the optical head 10. That is, the optical head 10 is arranged not on the side disc substrate, but on the side photomagnetic recording layer of the magneto-optical disc 15. The reason is that, since the optical head 10 records and/or reproduces by exploiting the evanescent light, the separation between the optical head 10 and the magneto-optical disc 15 needs to be reduced sufficiently.

This optical head 10 includes a glass substrate 20, a slider 25 arranged on the glass substrate 20, and an elastic member 30 supporting the slider 25. The optical head 10 also includes an optical fiber 35 of the single mode, propagating the laser light from a laser light source, and a movable mirror 40 for reflecting the laser light radiated from the optical fiber 35. The optical head 10 also includes a quarter wave plate 45 arranged on the optical axis of the laser light reflected by the movable mirror 40, and a prism 50 arranged on the optical axis of the laser light radiated from the prism 50. The optical head 10 also includes a collimator lens 55 for collimating the laser light radiated from the prism 50. The optical head 10 further includes a catadioptric lens 60, on which falls the laser light collimated by the catadioptric lens 55, and a magnetic field generating coil 65 arranged about the focal point of the catadioptric lens 60.

The optical system of the optical head 10, in which the optical path is folded on itself at the prism 50, is equivalent to the optical system shown in FIG. 8. The broken line in FIG. 10 shows an optical system in which the optical path is not folded on itself in this manner, that is the optical system shown in FIG. 8.

In this optical head 10, the catadioptric lens 60 has a first lens medium 61, making up a first surface 60a, a second surface 60b and a third surface 60c, and a second lens medium 62, constituting a fourth surface 60d. The second lens medium 62 is bonded to a surface containing the second surface 60d constituted by the first lens medium 61. The second lens medium 62 is constituted by a portion of the glass substrate 20. This second lens medium 62 is constituted by a portion of the glass substrate 20. That is, the glass substrate 20 is simultaneously used as a portion of the catadioptric lens 60, which is constituted by bonding the first lens medium 61 to the glass substrate 20.

In the glass substrate 20, serving simultaneously as a portion of the catadioptric lens 60, is embedded a magnetic field generating coil 65. Stated differently, there is embedded the magnetic field generating coil 65 in the second lens medium 62 constituting the catadioptric lens 60. This magnetic field generating coil 65 serves for applying a recording magnetic field to the magneto-optical disc 15 during recording on the magneto-optical disc 15, and is arranged for surrounding the focal point of the catadioptric lens 60. That is, the laser light incident on the catadioptric lens 60 is converged on an end face of the glass substrate 20 at the center of the magnetic field generating coil 65. The magnetic field generating coil 65 is formed by embedding a thin film coil pattern in the glass substrate 20 by, for example, the thin film process.

If the magneto-optical disc 15 is to be recorded and/or reproduced using this optical head 10, the magneto-optical disc 15 is run in rotation to get the optical head 10 floated over the magneto-optical disc 15. At this time, the separation between the glass substrate 20 and the magneto-optical disc 15 needs to be of the order of 100 nm or less by supporting the slider 25 in a elastic state by the elastic member 30.

The laser light is radiated from the laser light source, as the optical head 10 is floated over the magneto-optical disc 15. The laser light, thus radiated, is propagated through the optical fiber 35. The laser light, propagated by the optical fiber 35 and radiated from the optical fiber 35, is reflected by the movable mirror 40.

The laser light, thus reflected by the movable mirror 40, is incident on a prism 50 through the quarter wave plate 45. This quarter wave plate is used for compensating the retardance generated in the optical fiber 35 in forward and return paths, because the retardance of 90° is produced in the one-way path for the wavelength used.

In the present embodiment, it is presupposed that a reflecting film be coated on the prism 50, such that retardance is afforded by the quarter wave plate 45. However, since the angle of incidence on the inclined prism surface is approximately 45°, it is also possible to generate the retardance by exploiting the total reflection at the prism 50. This retardance is set by the refractive index of the prism 50, such that, if glass, such as BACD 11, is used, the retardance is approximately 46° for each total reflection. Therefore, if total reflection occurs twice in the prism 50, and the glass, such as BACD 11, is used, it is possible to afford retardance of approximately 90°, such that the prism 50 can simultaneously serve as the quarter wave plate 45.

The laser light, incident on the prism 50 through the quarter wave plate 45, is internally reflected by the prism 50 and thence routed to the collimator lens 55. The laser light incident on the collimator lens 55, is thereby collimated to fall on the cylindrical lens 60.

The laser light incident on the catadioptric lens 60 is amplified first by the first surface 60a, as a concave refractive surface, so as to fall on the second lens 60b, as a plane mirror. The laser light then is reflected by this second lens 60b to fall on the third surface 60c, as the concave non-spherical mirror. The laser light then is reflected by the third surface 60c so as to be converged through an aperture formed centrally of the second surface 60b on the total reflection plane of the fourth surface 60d.

At this time, the major portion of the laser light undergoes total reflection on the fourth surface 60d. Since the separation of the order of 10 nm is kept between the fourth surface 60d and the magneto-optical disc 15, part of the evanescent light is coupled with the magneto-optical disc 15 so as to be take outside of the lens. This evanescent light is exploited in the optical head 10 to record and/or reproduce the magneto-optical disc 15.

During recording, the evanescent light is coupled with the magneto-optical disc 15, as described above, at the same time as the current is caused to flow in the magnetic field generating coil 65 to generate the magnetic field to apply the magnetic field to the portion of the magneto-optical disc coupled with the evanescent light. In this manner, photomagnetic recording is made on the magneto-optical disc 15. The photomagnetic recording system may be a magnetic field intensity modulating system modulating the intensity of the magnetic field applied to the magneto-optical disc 15 in association with the information signals being recorded, or a light intensity modulating system modulating the intensity of the light illuminated on the magneto-optical disc 15 in association with the information signals being recorded.

Meanwhile, in this optical head 10, an actuator, not shown, is mounted on the movable mirror 40, which may be actuated to change the angle of reflection of the laser light by the movable mirror 40. If the angle of reflection by the laser light by the movable mirror 40 is changed, the angle of inclination of the incident light beam on the catadioptric lens 60 is changed. The result is that the converging point on the fourth surface 60d of the catadioptric lens 60 is moved along the operating direction of the movable mirror 40.

That is, in the present optical head 10, the angle of reflection of the laser light by the movable mirror 40 is changed to cause the converging point on the fourth surface 60d of the catadioptric lens 60 to sweep along the operating direction of the movable mirror 40. In this manner, it is possible with the present optical head 10 to perform so-called accessing or tracking in the field of view.

Meanwhile, in the conventional catadioptric lens, the coma aberration is produced if the angle of inclination of the incident light beam is changed, so that it has not been possible to change the angle of inclination of the incident light beam. In the catadioptric lens 60, loaded on the optical head 10, the coma aberration has been corrected substantially completely. Therefore, with the optical head 10, the angle of inclination of the incident light beam on the catadioptric lens 60 can be changed to perform so-called accessing or tracking in the field of view.

The main point of the optical head 10 embodying the present invention is the catadioptric lens 60. Therefore, the foregoing description has been centered on the portion of the optical system including the catadioptric lens 60 converging the laser light illuminated on the magneto-optical disc 15, whilst the explanation on other portions of the optical system has been omitted. However, in reality, the optical head 10 is naturally provided with an optical system adapted for detecting the return light reflected back from the magneto-optical disc 15.

The present invention may also be applied to other than an optical head adapted to record and/or reproduce an magneto-optical disc. An optical recording medium to be encompassed by the present invention may also be a phase change optical disc or a replay-only optical disc in which information signals are pre-written by embossed pits. It is noted that, if the optical recording medium is a disc not in need of a magnetic field for recording and/or reproduction, such as the phase change optical disc or the replay-only optical disc in which information signals are pre-written by embossed pits, the magnetic field generating coil may be dispensed with.

INDUSTRIAL APPLICABILITY

With the catadioptric lens according to the present invention, in which the coma aberration among the off-axis aberrations is corrected substantially completely, such that the range of the incident angle of the incident light beam up to at least approximately ±3° is sufficiently allowable.

Thus, with the catadioptric lens according to the present invention, the coma aberration has been corrected substantially completely to permit a wide range of allowance of the incident angle of the incident light beam, so that the lens mounting tolerance may be appreciably wider than in the conventional system. Therefore, in mounting the catadioptric lens on the optical head, the assembling process can be facilitated to enable the assembling to be completed accurately in a shorter time.

Moreover, with the catadioptric lens according to the present invention, the coma aberration has been corrected substantially completely, so that, by changing the angle of inclination of the incident light beam speedily using e.g., a movable mirror, the converging point can be swept along the operating direction of the movable mirror. In this manner, the so-called accessing in the field of view or the tracking in the field of view is possible in the optical head.

Also, in the optical head and the optical recording and/or reproducing apparatus according to the present invention, employing a catadioptric lens in which the coma aberration among the off-axis aberrations is corrected substantially completely, the catadioptric lens mounting tolerance can be significantly wider than in the conventional system. The result is that the catadioptric lens assembling process can be facilitated to enable the assembling to be completed accurately in a shorter time.

Furthermore, in the optical head and in the optical recording and/or reproducing apparatus, according to the present invention, employing the catadioptric lens in which the coma aberration among the off-axis aberrations is corrected substantially completely, the angle of inclination of the incident light beam on the catadioptric lens can be changed speedily, using a movable mirror or the like, to sweep the converging point in the operating direction of the movable mirror. This permits the so-called accessing or tracking in the field of view to be performed.

What is claimed is:

1. A catadioptric lens in which a first surface is a concave refractive surface, a second surface is a plane mirror, and a third surface is a concave non-spherical mirror, arranged co-axially as the concave refractive surface of said first surface, and in which a parallel incident light beam is converged through an aperture provided in the plane mirror of the second surface on a plane of total reflection of the fourth surface, wherein if $r_1$ is the radius of curvature of said first surface, $r_3$ is the center radius of curvature of said third surface, d is an optical length from the first surface to an apex of the third surface, $f_a(N)$ and $f_b(N)$ are coefficients represented as functions of the refractive index N of a lens medium, a condition satisfying the sine condition is as shown in the following equation:

$$d/r_3 = f_a(N)r_3 + f_b(N) \qquad (1)$$

the value of the radius of curvature $r_1$ of said first surface and the value of the optical length d from the first surface to the apex of the third surface, when the above equation (1) is satisfied, are R and D, respectively, the radius of curvature $r_1$ of said first surface is R±1% and the optical length d from the first surface to the apex of the third surface is D±0.5%.

2. The catadioptric lens according to claim 1 wherein a lens is arranged upstream of said first surface.

3. The catadioptric lens according to claim 1 wherein each of said first to third surfaces is constituted by a first lens medium and said fourth surface is constituted by a second lens medium; and wherein said second lens medium is bonded to the plane containing the second surface constituted by said lens medium.

4. The catadioptric lens according to claim 3 wherein a magnetic field generating coil is embedded in said second lens medium.

5. The catadioptric lens according to claim 1 wherein said third surface is a routine non-spherical surface represented by the equation:

$$X=(Y^2/R)/[1+\{1-(1+K)(Y/R)^2\}^{1/2}]+AY^4+BY^6+CY^8+DY^{10} \qquad (2)$$

where, as to said third surface, X is the depth from the apex of the surface, X is the height from the optical axis, R is the center radius of curvature, K is the conical coefficient, A is the non-spherical coefficient of the term $Y^4$, B is the non-spherical coefficient of the term $Y^6$, C is the non-spherical coefficient of the term $Y^8$ and D is the non-spherical coefficient of the term $Y^{10}$.

6. The catadioptric lens according to claim 1 wherein the refractive index of the lens medium is not less than 1.4 in the wavelength range in use.

7. An optical head having, as an objective lens, a catadioptric lens in which a first surface is a concave refractive surface, a second surface is a plane mirror, and a third surface is a concave non-spherical mirror, arranged co-axially as the concave refractive surface of said first surface, and in which a parallel incident light beam is converged through an aperture provided in the plane mirror of the second surface on a plane of total reflection of the fourth surface, wherein if $r_1$ is the radius of curvature of said first surface, $r_3$ is the center radius of curvature of said third surface, d is an optical length from the first surface to an apex of the third surface, $f_a(N)$ and $f_b(N)$ are coefficients represented as functions of the refractive index N of a lens medium, a condition satisfying the sine condition is as shown in the following equation:

$$d/r_3 = f_a(N)r_1/r_3 + f_b(N) \qquad (3)$$

and the value of the radius of curvature $r_1$ of said first surface and the value of the optical length d from the first surface to the apex of the third surface, when the above equation (1) is satisfied, are R and D, respectively, the radius of curvature $r_1$ of said first surface is R±1% and the optical length d from the first surface to the apex of the third surface is D±0.5%.

8. An optical recording and/or reproducing apparatus for recording and/or reproducing an optical recording medium using an optical head, said optical head having, as an objective lens, a catadioptric lens in which a first surface is a concave refractive surface, a second surface is a plane mirror, and a third surface is a concave non-spherical mirror, arranged co-axially as the concave refractive surface of said first surface, and in which a parallel incident light beam is converged through an aperture provided in the plane mirror of the second surface on a plane of total reflection of the fourth surface, wherein if $r_1$ is the radius of curvature of said first surface, $r_3$ is the center radius of curvature of said third surface, d is an optical length from the first surface to an apex of the third surface, $f_a(N)$ and $f_b(N)$ are coefficients represented as functions of the refractive index N of a lens medium, a condition satisfying the sine condition is as shown in the following equation:

$$d/r_3 = f_a(N)r_1/r_3 + f_b(N) \tag{4}$$

the value of the radius of curvature $r_1$ of said first surface and the value of the optical length d from the first surface to the apex of the third surface, when the above equation (1) is satisfied, are R and D, respectively, the radius of curvature $r_1$ of said first surface is R±1% and the optical length d from the first surface to the apex of the third surface is D±0.5%.

* * * * *